3/28/78 XR 4,081,723

United States Patent [19] [11] 4,081,723
Vetter et al. [45] Mar. 28, 1978

[54] PRINTING MACHINE

[75] Inventors: Lothar Vetter, Radebeul; Karl-Heinz Förster, Dresden; Klaus Schanze, Coswig, all of Germany

[73] Assignee: Veb Polygraph Leipzog Kombinat fur Polygraphische Maschinen und Ausrustungen, Leipzig, Germany

[21] Appl. No.: 574,092

[22] Filed: May 2, 1975

[51] Int. Cl.$^2$ .................... H02K 41/02
[52] U.S. Cl. .................... 318/38; 101/181; 101/232; 271/204; 271/193; 310/13; 318/135
[58] Field of Search .................... 310/12-14; 318/135, 35-37, 38

[56] References Cited

U.S. PATENT DOCUMENTS

| | | | |
|---|---|---|---|
| 3,225,228 | 12/1965 | Roshala | 310/12 |
| 3,616,762 | 11/1971 | Benner | 310/13 X |
| 3,675,585 | 7/1972 | Wiart et al. | 318/135 X |
| 3,731,166 | 5/1973 | Inuzuka | 318/35 |
| 3,763,776 | 10/1973 | Jaffa | 101/126 |
| 3,795,189 | 3/1974 | Jaffa | 101/123 |
| 3,898,928 | 8/1975 | Kaneko | 101/132.5 |

*Primary Examiner*—Donovan F. Duggan
*Attorney, Agent, or Firm*—Michael J. Striker

[57] ABSTRACT

A sheet printing station is arranged between a sheet pick-up station and a sheet discharge station. A plurality of linear motors is provided, including electrically conductive rails which constitute the stators of the motors and are mounted at opposite lateral sides of the stations. Each of the rails form an endless loop which connects all of the stations. One or more carriages are mounted on the rails for travel along the same and constitute the armature of the respective motors. Sheet grippers are arranged on the carriage or carriages, and a control arrangement controls the travel of the carriage or carriages along the rails.

11 Claims, 9 Drawing Figures

FIG. 2
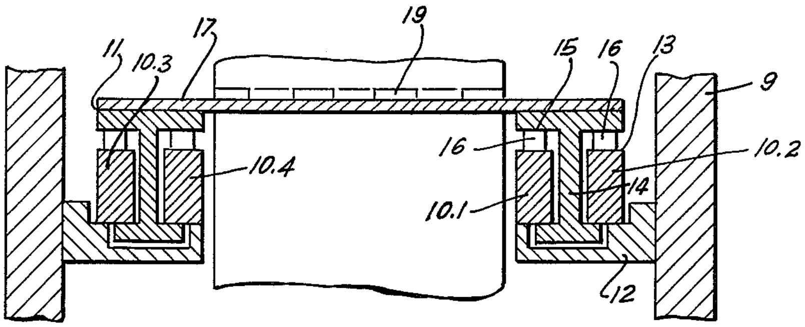
FIG. 2a
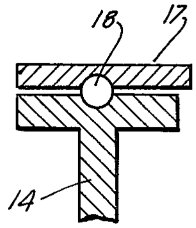
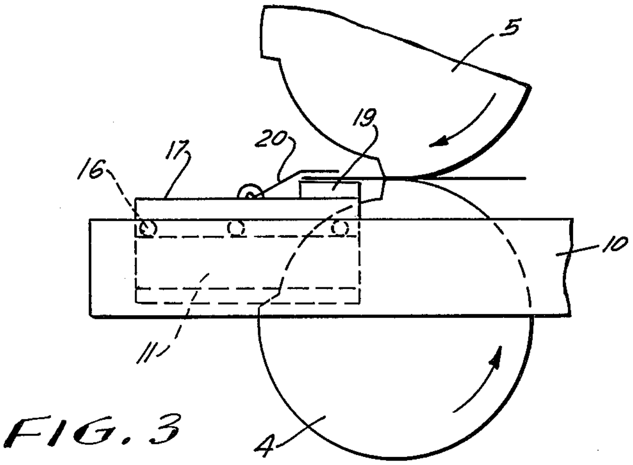
FIG. 3
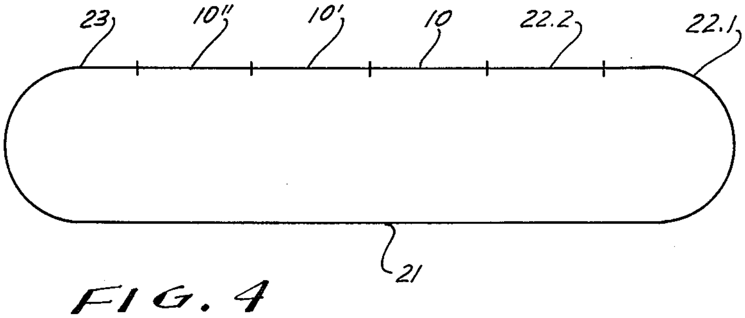
FIG. 4

PRINTING MACHINE

BACKGROUND OF THE INVENTION

The present invention relates to a printing machine, and more particularly to a printing machine having a sheet-gripping carriage which travels between a sheet pick-up station and a sheet discharge station and past a sheet printing station.

It is known from German Pat. No. 1,930,317 to supply the sheets to be printed in a printing machine in succession and in a straight line path to one or a plurality of sheet printing stations, and to make them travel through these stations to a sheet discharge station. The sheet grippers in this construction are mounted on flexible belts or the like. However, this construction requires arrangements for synchronizing the movements of the belts with the sheet gripper devices thereon on the one hand, and of the cylinders of the printing station or stations on the other hand. This is relatively difficult, and in addition to arrangement has no possibility of compensating for errors in the location of the sheets as they arrive at the sheet printing station or approach the same, or for sheets that may be positioned skew with reference to their path of travel.

SUMMARY OF THE INVENTION

It is an object of the present invention to provide an improved printing machine for printing of sheets.

More particularly, it is an object of this invention to provide an improved printing machine having a gripper carriage provided with grippers and serving to advance the sheets, preferably but not necessarily in a horizontal path.

Another object of the invention is to provide such an improved printing machine wherein the movements of the gripper carriage are so controlled that the carriage will travel at different speeds in different portions of its travel path.

In keeping with these and other objects which will become apparent hereafter, one feature of the invention resides in a printing machine, comprising a sheet printing station, a sheet pick-up station ahead of the printing station, and a sheet discharge station past the printing station. Linear motor means is provided, including electrically conductive rails constituting the stators of said motor means and mounted at opposite lateral sides of said stations and each forming an endless loop which connects all of said stations, and a carriage mounted on said rails for travel along the same and constituting the armature of said motor means. Sheet grippers are provided on the carriage, and control means is provided for controlling the travel of the carriage along the rails.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a vertical section through the rails and the gripper carriage in FIG. 1;

FIG. 2*a* is a sectioned fragmentary detailed view, illustrating a modified embodiment;

FIG. 3 is a fragmentary highly diagrammatic side view showing a detail of the gripper carriage and the rails;

FIG. 3*a* is a view of FIG. 3, looking towards the left;

FIG. 4 is a diagrammatic side view showing how each of the rails is subdivided into sections;

DESCRIPTION OF THE PREFERRED EMBODIMENTS

Figure 1:
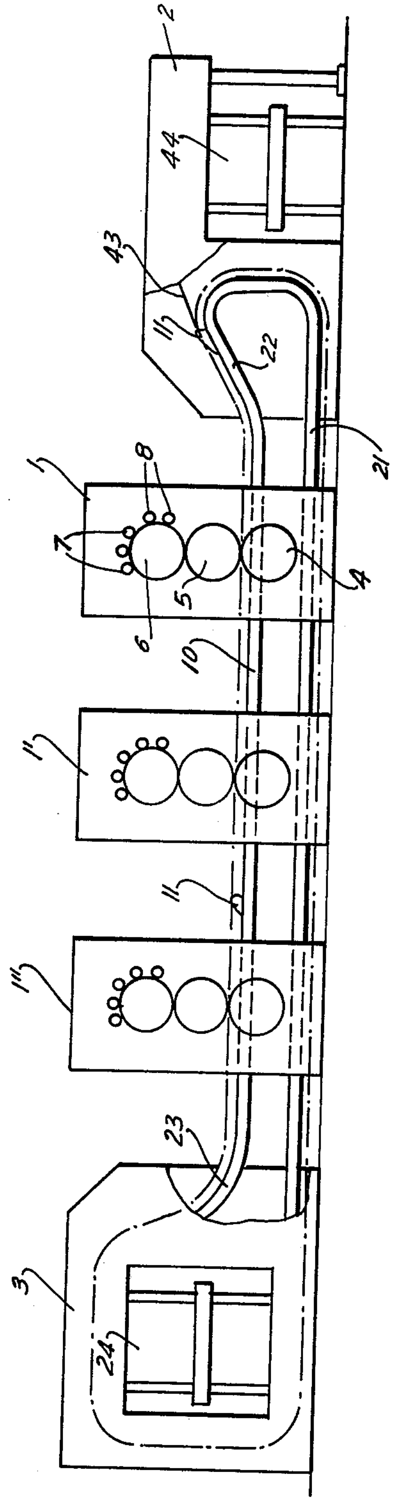
FIG. 1 is a diagrammatic side-elevational view of a printing machine embodying the invention, to illustrate the principle of the invention.

FIG. 1 illustrates diagrammatically a printing machine embodying the present invention. The elements which are known in the art have been shown only diagrammatically. It will be seen that the machine has one or any desired number of sheet printing stations, here identified with reference characters 1, 1' and 1". It also has a sheet feeding or pick-up station 2 and a sheet stacker or discharge station 3. Each of the printing stations 1, 1' and 1" has a printing cylinder 4, an offset cylinder 5, a printing form cylinder 6, an inking unit 7 and a moistening unit 8.

The printing machine of FIG. 1 need not be an offset printing machine, but can also be used for other types of printing, such as relief printing or intaglio printing; in that case the offset cylinder 5 and the moistening unit 8 would be omitted. The arrangement of the components in the respective printing units is known from the art and requires no detailed description.

The machine has a frame 9 on which there are mounted two rails 10 located at opposite lateral sides of the printing units 1, 1' and 1". As FIG. 2 shows, the rail 10 at one side is identified with reference characters 10.1 and 10.2, and the rail 10 of the other side is identified with reference characters 10.3 and 10.4. It is clear that each of the rails 10 is split and that the portions 10.1 and 10.2 define with one another a gap, just as the portions 10.3 and 10.4 define with one another a gap. One or more gripper carriages 11 are provided, and constitute the armature of linear motors whose stators are constituted by the rail 10 having the portions 10.1 and 10.2 and the rail 10 having the portions 10.3 and 10.4, respectively. The operation of linear motors is known; it will be recalled that a travelling electromagnetic field is produced in them which affects the movement of the armature 11 lengthwise of the stator.

FIGS. 2, 3 and 3*a* show how the rails 10 cooperate with the gripper carriage 11. Holding members 12 are provided on the frame 9 at opposite lateral sides of the machine, and these mount the rails 10 at the opposite lateral sides. The upper surfaces of these rails are identified with reference numeral 13. The center positions of two double T-shaped gripper carriage parts 14 extend into the gaps defined between the portions of the respective rails 10, that is defined between the portions 10.1 and 10.2, and 10.3, 10.4, respectively. Contact faces 15 on the frames 14 are in contact with rollers 16 which in turn rolls on the surfaces 13. The upper parts of the carriage sections 14 are connected with one another by a transversely extending connecting member 17 which is rigidly connected with the carriage sections 14.

FIG. 2*a* shows an alternate embodiment according to which the transverse member 17 can be connected with the carriage sections 14 by means of interposed spherical elements 18, as illustrated in the sectional showing of FIG. 2*a*.

The transversely extending member 17 is provided with a plurality of laterally adjacent sheet gripping devices each composed of an abutment 19 and a gripper 20. The printing cylinder 4 and the offset cylinder 5 are provided with channels to permit the passage of the gripper carriage 11 through the line of contact where the two cylinders 4 and 5 engage one another, as shown in FIG. 3.

Each rail 10 is further provided with a return section 21; these are constructed in the same manner as described in FIG. 2 and therefore require no further detailed discussion. When the carriage or carriages 11 return along the portion 21, they are supported on them by the lower part of the respective double-T-shaped carriage section 14.

The portions 21 are connected with the remainders of the rails 10 mechanically to form an endless loop. A printing machine may be provided with a known pick-up station and a known discharge station which are conventional in the art and require no detailed discussion.

In the illustrated embodiment shown in the drawing the printing machine is provided with a sheet pick-up station 2 which operates in accordance with the principle of the present invention. The rail portion 21 of each rail is connected with the upper portion of the respective rail 10 by a connecting portion 22 in the region of the pick-up station 2 and by a connecting portion 23 in the region of the discharge station 3. The connection is mechanical and again an endless loop is obtained. The pick-up station 2 is provided with known means for withdrawing each sheet from a sheet stack 44 and supply it to the respective gripper carriage 11. The discharge station 3 can be of any known construction, or it can be of a type which according to the present invention operates on the linear-motor principle.

The connecting portions 23 extend over and around the stack 24 of discharged sheets.

Each of the rails 10 will be seen from the foregoing to be composed of a plurality of rail sections which are mechanically connected with one another. Moreover, these rail sections are electrically insulated from one another so that each rail 10 is composed, as seen in FIG. 4, of rail sections 10′,10″, 23, 21, 22.1 and 22.2. The purpose of this subdivision is to be able to obtain differential rates of movement for the gripper carriage 11 in the different rail sections. In the region or section 10′ and 10″ the carriage 11 must move at a speed which assures its synchronism with the operating speed of the rollers 4 and 5. In the region 23 the carriage 11 must be retarded in order to assure an exact deposition of the respective sheet onto the stack 24. In the region 21 the carriage 11 again travels at the operating speed of the cylinders 4 and 5, in the region 22.1 it must again be retarded in order to obtain proper pick-up of a new sheet, and in the region 22.2 it must be accelerated in order to be brought up to synchronism with the operating speed of the rollers 4, 5 by the time it reaches the respective printing stations 1, 1′ and 1″.

The rail sections in each of the regions shown in FIG. 4 are connected with an output of a control device 45 which will be described with reference to FIG. 5. It is possible to either connect the identical rail sections of both rails 10 with this output (i.e. for both rails 10 the sections which constitute, for example, the section 21), or in each rail 10 the respective rail section may be connected with a separate control device 45 so that the linear motors at one side of the machine will be controlled independently of those at the opposite side of the machine.

Figure 5:
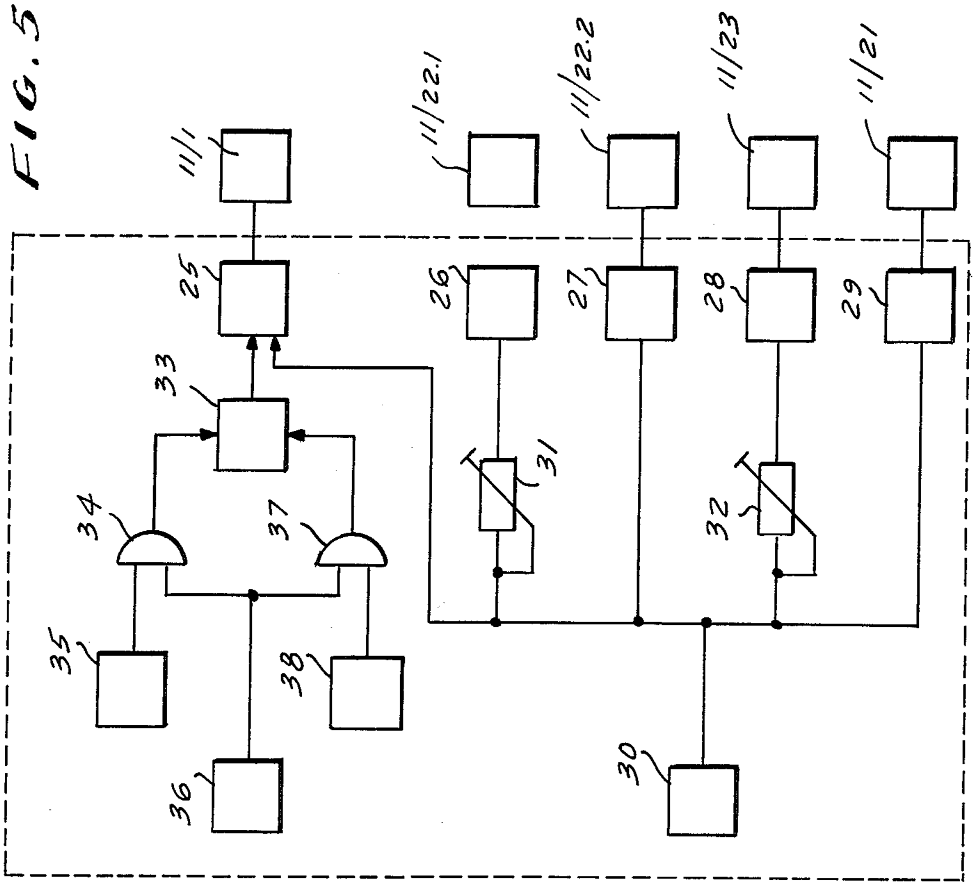
FIG. 5 is a block diagram showing the electronic circuit of a control device of the apparatus in FIG. 1.

Even if two of the control devices 45 are provided, they will be identical; therefore, the description of a single device with reference to FIG. 5 will suffice for an understanding of the invention.

Each linear motor of one region, for example the region 22.1 the region 22.2, etc. is composed of a rail section constituting the stator and the carriage 11 constituting the armature. Each of these linear motors has associated with it in the device 45 a frequency converter 25, 26, 27, 28 or 29. For the sake of better explanation the linear motors in FIG. 5 are designated with reference numeral combinations which are composed of the respective rail section and the carriage, namely the linear motor of the return section 21 is designated as 11/21, the linear motor of the printing stations with 11/1 (which includes, i.e. applies analogously to 1′ and 1″), the linear motor of the discharge section with 11/23, the linear motor of the retarding section with 11/22.1 and the linear motor of the accelerating section with 11/22.2. The frequency converters 25–29 are commercially available and require no detailed description.

Figure 7:
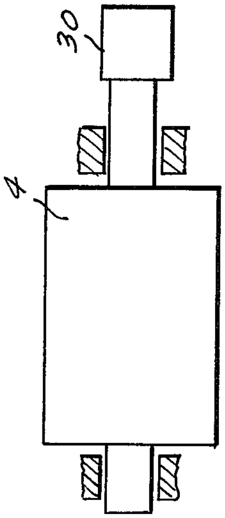
FIG. 7 is a further diagrammatic section, illustrating an arrangement of a signal generator used in the apparatus of FIG. 1.

The frequency converter 25 of the linear motors 11/1 (which includes 1′ and 1″), the frequency converter 27 of the linear motor 11/22.2, and the frequency converter 29 of the linear motor 11/21 are each connected directly with the output of a signal generator 30 which generates signals in accordance with the angular displacement of one of the cylinders of the respective printing station, for example the cylinder 4 with which it is connected as shown in FIG. 7.

The frequency converter 26 of the linear motor 11/22.1 and the frequency converter 28 of the linear motor 11/23 are each also connected with the signal generator 30, but in their case a signal reducing element 31 or 32 is interposed in the connection. These reducing elements may be in form of commercially available resistors.

A regulating arrangement 33 is associated with the frequency converter 25; it has a first input which is connected with an AND-gate 34. The AND-gate 34 in turn has two inputs one of which is connected with a device 35 which indicates the movement of the sheets and the other input is connected with a synchronizing arrangement 36. The second input of the regulating device 33 is connected with a further AND-gate 37 which again has two inputs, one of which is connected with a device 38 indicating angular displacement of one of the cylinders of one of the printing stations, and the other of which is connected with the synchronizing device 36.

Figure 6:
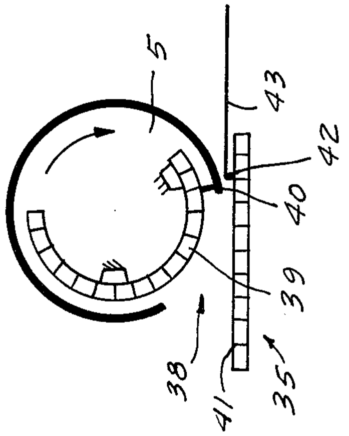
FIG. 6 is a diagrammatic section, illustrating details of sensing arrangements used in the apparatus of FIG. 1.

The construction of the devices 35 and 38 is illustrated in FIG. 6. It will be seen that the device 38 has a known photomatrix 39 which is fixedly mounted in the region of the offset cylinder 5, and a light source 40 which is mounted on the offset cylinder 5 on a lateral extension of the printing line.

The device 35 is composed of a further photomatrix 41 which is fixedly mounted in the region of the offset cylinder 5 and of the path of travel of the sheets, and a further light source 42 which is mounted on the gripper carriage 11 on a lateral extension of the printing line. The device 38 is provided for each of the printing units 1, 1' and 1"; the device 35 is provided in duplicate for each of the printing units, each side of the respective printing unit having one device 35 associated with it.

Of course, not every printing unit need be provided with these devices; it is possible to provide only the printing unit 1 with them, that is the printing unit which is the first one along the path leading from the sheet pick-up stating 2 to the sheet discharge station 3. This embodiment is illustrated in the drawing (compare FIG. 5). If each of the stations 1, 1' and 1" is to be provided with the devices 35 and 38, then the arrangement 45 would have to be appropriately amplified.

The reference value for the basic frequency of the travelling electromagnetic fields of the respective linear motors, and thereby for reference value for the speed of advancement of the linear motors, is given by the rotations of the cyliners of the printing station per unit time. The reference value for the frequency converters of the linear motors for the printing stations is additionally so influenced via the devices 35 and 38 that the difference of the travelled distances is reduced to zero.

The resistors or analogous devices 31, 32 reduce the reference value of the frequency in such a manner that the speed of the subsequently following linear motors, namely those for the sections 22.1 and 23, will be retarded. The linear motors may be constructed as synchronous motors or asynchronous motors.

The synchronizing arrangement 36 applies the signals of the devices 35 and 38 only to the linear motors located in the region of these devices.

Thus, the linear motor 11/1 (which includes 1' and 1") always assures travel at the basic speed when the next-following gripper carriage arrives, independently of the previous regulation of the speed of the preceding gripper carriage 11.

Intermediate the linear motors having differential speeds, or rather having travelling electromagnetic fields or differential speeds, the gripper carriages are either braked or accelerated, and neither of these functions is controlled with reference to the speed of rotation of the cylinder of the printing station or stations.

The respective sheet 43 that is to be printed is picked up from the stack 44 at the station 2, by means of known devices, for example suction grippers which move to and fro, and is furnished to the grippers 19, 20 of the respective gripper carriage 11. This furnishing takes place as the gripper carriage 11 travels in the region 22.1 at reduced speed. The determination of the speed is effected via the signal generator 30, the device 31 and the frequency converter 26. After the sheet 43 is engaged by the grippers of the gripper carriage 11 the latter is accelerated in the section 22.2 to the normal machine speed, and the determination of the speed in this case is effected by the signal generator 20 and the frequency converter 27. Ahead of the first printing station, that is the printing station 1 in the embodiment of FIG. 1, a determination is made where the printing line of the sheet 43 is located at the time the measurement is made, and this is effected by means of the device 35. This determination is made at both sides of the machine to be able to detect if the sheet 43 is located skew, in which case the printing line would of course also be located skew. At the same time the device 38 determines where exactly the printing line is located.

The determination of the time at which the measurement is to be made is effected the synchronizing arrangement 36, which may be constructed as a known timing switch. The signals generated by the devices 35 and 38 are supplied to the regulating device 33 where the difference of the path is reduced to zero. The signals furnished by the regulating device 33 are supplied to the frequency converter 25 which is also connected with the signal generator 30.

The frequency at the output of the frequency converter 25 serves to control the linear motor 11/1 (which includes 1' and 1"); it is dependent upon the number of rotations of the cylinder per unit time (base frequency) and the difference of the paths traversed by sheet 43 and cylinder (the difference frequency).

In dependence upon the difference of the paths, that is the difference of the paths of sheets and cylinder, the gripper carriage 11 is accelerated or retarded, and thereby the printing line of the sheet 43 is made to coincide with the printing line of the offset cylinder 5, i.e. at the time at which the sheet travels on the carriage 11 through the respective printing station the printing line of the sheet will coincide with the printing line of the offset cylinder 5.

This latter operation can be effected at the first one of the printing stations, e.g. the printing station 1, or it can be effected at each and every one of the printing stations. It can also be carried out at one side or at both sides of the machine. This makes it possible to properly adjust the various sheets and bring their printing line into proper coincidence with the printing line of the cylinder 5, irrespective of whether the sheets have been travelling too fast or too slow, or whether they are located skew. Evidently, if the sheet is found to be located skew, then the linear motor 11.1 at that side of the machine where the printing line is too far forward will be retarded, and the linear motor at the opposite side will be accelerated.

When a sheet has been printed in all printing stations it is furnished to the discharge station 3. In order to obtain an exact deposition of the printing sheet onto the stack 24 the carriage 11 is retarded in the section 23. The determination of the carriage speed in this case is effected by the signal generator 30, the member 32 and the frequency converter 28.

After the sheet has been discharged the carriage 11 is returned to the station 2 via the section 21, and the determination of the speed at which it is to travel is effected by the signal generator 30 and the frequency converter 29.

The operation of the photomatrix 39 used in the device 38, and of the photomatrix 41 used in the device 35, is well known in the art and requires no detailed description.

It will be understood that each of the elements described above, or two or more together, may also find a useful application in other types of constructions differing from the types described above.

While the invention has been illustrated and described as embodied in a printing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a printing machine, a combination comprising a sheet printing station; a sheet pick-up station ahead of said printing station; a sheet discharge station past said printing station; linear motor means, including electrically conductive rails constituting the stators of said motor means and mounted at opposite lateral sides of said stations and each forming and endless loop which connects all of said stations, and a carriage mounted on said rails for travel along the same and constituting the armature of said motor means; sheet gripping means on said carriage for picking respective sheets up at said pick-up station, supplying them to said printing station and depositing the printed sheets at said discharge station; and control means for causing said carriage to travel along said rails in the region of said pick-up and discharge station at speeds which differ from the speeds at which it travels in the region of said printing station.

2. In a printing machine, a combination comprising a sheet printing station; a sheet pick-up station ahead of said printing station; a sheet discharge station past said printing station; linear motor means, including electrically conductive rails constituting the stators of said motor means and mounted at opposite lateral sides of said stations and each forming an endless loop which connects all of said stations, and a carriage mounted on said rails for travel along the same and constituting the armature of said motor means, said rails being composed of a plurality of rail sections constituting with said carriage respective linear motors, including a retarding motor and an accelerating motor in the region of said pick-up station, a motor for advancing said carriage through said printing station, a motor in the region of said discharge station, and a carriage-return motor; sheet grippers on said carriage; and control means for controlling the travel of said carriage along said rails, said control means comprising a plurality of frequency converters, said motors each being connected to an output of a respective one of said frequency converters, said frequency converters having first-inputs connected with a signal-generator which generates signals as a function of the rotation of a cylinder in said printing station, a signal-reducing element being interposed in circuit between said signal-generator and the frequency converters which are connected with said retarding motor and said motor in the region of said discharge station, and said frequency converters having second inputs connected with a regulating device for regulating the movement of said carriage in dependence upon the relative positions of the printing line and of a sheet carried by said carriage.

3. A combination as defined in claim 1, wherein said rails comprise rail sections in the region of said pick-up station and connected with said control means, said rail sections forming together with said carriage respective linear motors.

4. A combination as defined in claim 1, wherein said rails comprise rail sections in the region of said discharge station and connected with said control means, said rail sections forming together with said carriage respective linear motors.

5. A combination as defined in claim 1, wherein each of said rails includes a first rail section in the region of said pick-up station, a second rail section in the region of said discharge station, a third rail section in the region of said printing station and connecting said first and second rail sections, and a return rail section extending from the region of said discharge station to the region of said pick-up station and also connecting said first and second rail sections to one another; and further comprising electrically insulating means insulating said rail sections from one another.

6. A combination as defined in claim 1, wherein said rails each include a rail section in the region of said pick-up station, said rail section being composed of two portions which are electrically insulated from one another and on which said carriage is respectively retarded and accelerated.

7. A combination as defined in claim 1, wherein said rails each include a rail section in the region of said discharge station, said rail section being composed of two portions which are electrically insulated from one another.

8. A combination as defined in claim 2, wherein said control means comprises a first control device for the linear motors formed by said carriage and the rail sections of one of said rails, and an independent second control device for the linear motors formed by said carriage and the rail sections of the other of said rails.

9. A combination as defined in claim 2, wherein said signal-generator comprises a fixed photo-matrix and a light source cooperating with said photo-matrix and rotating together with a cylinder of said printing station.

10. A combination as defined in claim 2, wherein said regulating device comprises a fixed light-source laterally of said printing station, and a cooperating photo-matrix.

11. A combination as defined in claim 2, a synchronizing device connected with said signal-generator and with said regulating device; and AND-gates connected with outputs of said signal-generator and of said regulating device.

* * * * *